US006922723B1

(12) United States Patent
Sharp et al.

(10) Patent No.: US 6,922,723 B1
(45) Date of Patent: Jul. 26, 2005

(54) METHODS AND APPARATUSES FOR UPDATING MOBILE COMPUTER LOCATION CONFIGURATION SETTINGS

(75) Inventors: Glen Sharp, St. Catharines (CA); Nick Woron, St. Catharines (CA)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/547,294

(22) Filed: Apr. 11, 2000

(51) Int. Cl.[7] .............................................. G06F 15/177
(52) U.S. Cl. ....................... 709/221; 709/218; 709/219; 709/200; 709/222
(58) Field of Search ................................ 709/218, 219, 709/220, 221, 222

(56) References Cited

U.S. PATENT DOCUMENTS

| | | | |
|---|---|---|---|
| 5,283,887 A | | 2/1994 | Zachery |
| 5,557,780 A | | 9/1996 | Edwards et al. |
| 5,627,997 A | | 5/1997 | Pearson et al. |
| 5,937,160 A | * | 8/1999 | Davis et al. ............ 395/200.33 |
| 6,003,070 A | * | 12/1999 | Frantz ......................... 709/206 |
| 6,029,196 A | * | 2/2000 | Lenz ........................... 709/221 |
| 6,055,227 A | * | 4/2000 | Lennert et al. ............. 370/254 |
| 6,477,522 B1 | * | 11/2002 | Young ............................ 707/2 |
| 6,480,889 B1 | * | 11/2002 | Saito et al. .................. 709/220 |

FOREIGN PATENT DOCUMENTS

| | | |
|---|---|---|
| WO | WO 92/22033 | 12/1992 |
| WO | WO 99/20014 | 4/1999 |

OTHER PUBLICATIONS

"DynamicAccess® Technology," 3COM Technical Paper, Online!, Aug. 1999, XP002193230, www.3com.com/corpinfo/en_US/technology/tech_paper.jsp?DOC_ID=38, pp. 1–17.*

(Continued)

*Primary Examiner*—Hosain Alam
*Assistant Examiner*—Liang-che Wang
(74) *Attorney, Agent, or Firm*—Fliesler Meyer LLP

(57) ABSTRACT

A method for a user's mobile client computer to update its configuration specification involves receiving an e-mail from an administrator containing location settings encoded in an attachment, openings the attachment to the e-mail, and writing location values corresponding to the location settings encoded in the attachment into the configuration specification of the computer. In the preferred embodiment, the e-mail includes a designation of a location name corresponding to the configuration specification. In the e-mail attachment, the location settings are generically defined so as to apply to a variety of operating systems. The user's mobile client application determines an operating system type for the computer, and generates the location values by interpreting the location settings for the operating system type for the computer. The interpretation of the generic location settings to produce the location values involves referring to program logic which translates the location settings into location values as a function of the operating system type for the computer. The location settings which may be specified according to the present invention includes internet settings, such as internet protocol address, a domain name server configuration, a gateway, and a WINS configuration, and further include dialing settings or local area network settings. According to another aspect, an administrator application provides a user's client computer with configuration settings. The administrator application specifies a location name for the user's client computer. The administrator application further creates an e-mail addressed to the user having the location settings encoded in an attachment, and the administrator application sends the e-mail to the user.

8 Claims, 14 Drawing Sheets

OTHER PUBLICATIONS

"DynamicAccess® Technology," 3COM Technical Paper, Online!, Aug. 1999, XP002193230, www.3com.com/corpinfo/en_US/technology/tech_paper.jsp?DOC_ID=38>, pp. 1–17.

"Symantec Mobile Essentials™ User's Guide," Symantec User's Guide, Online!, Jan. 2000, XP002193975, www.sit.ulaval.ca/licenses/symantec/sme25usr–us.pdf>, pp. i–ii, vii–ix, 35–46.

Song, Gavin, "MIME: Multimedia on the Internet", Unix Review, Apr. 1995, pp. 43–52.

Cobb, Michael, "Put Your Personal Data Under Lock and Key", Databased Web Advisor, Oct. 1997, pp. 72–75.

Ouhyoung, Ming, et al. "The MOS Multimedia E–Mail System", International conference selected papers, 1994, pp. 315–324.

* cited by examiner

| | LOCATION NAME | HOME |
|---|---|---|
| 301 | | |
| 302 | COUNTRY | |
| 303 | CITY | |
| 304 | TIME ZONE | |
| 305 | URL | |
| 306 | DIALING SETTINGS | |
| 307 | NETWORK SETTINGS | |
| 308 | TCP/IP INTERNET SETTING | |
| 309 | IP ADDRESS | 104.93.108.5 |
| 310 | DNS CONFIGURATION | DISABLE |
| 311 | GATEWAY | |
| 312 | WINS CONFIGURATION | DHCP |
| 313 | DIAL-UP NETWORKING | |
| 314 | DEFAULT PRINTER | |
| 315 | NETSCAPE PROXY SETTINGS | |
| 316 | INTERNET EXPLORER PROXY SETTINGS | |
| 317 | WINFAX PRO DIALING LOCATION | |
| 318 | LOTUS NOTES LOCATION | |
| 319 | LOTUS CCMAIL LOCATION | |
| 320 | DEFAULT MAPI PROFILE FOR OUTLOOK | |

METHODS AND APPARATUSES FOR UPDATING MOBILE COMPUTER LOCATION CONFIGURATION SETTINGS

BACKGROUND OF THE INVENTION

1. Field of the Invention

The present invention pertains to the field of personal computers which are mobile. Specifically, the present invention pertains to the configuration of mobile personal computers within various local area networks.

2. Discussion of the Related Art

An increasing number of companies are boosting the productivity of field personnel by equipping them with laptop computers. These mobile professionals need easy access to the corporate network from a variety of sites: branch offices, manufacturing facilities, distribution centers, customer sites, hotel rooms, and even home.

Providing network access to a growing mobile workforce poses a significant challenge for the information technology (IT) staff. Remote access involves entering complicated connection settings manually each time the user attempts to access the network from a different site. Research indicates that business travelers typically spend about 20 minutes adjusting PC settings every time they arrive at a new location. This nonproductive time increases significantly if the user enters incorrect information and must spend time finding and fixing the problem. In many cases, the user calls the help desk for assistance. The costs associated with the loss in productivity for the mobile professional and the increased support costs can approach $1 million for a company with 1,000 mobile users.

The IT staff is tasked with simplifying remote access to eliminate downtime and reduce cost of supporting mobile user. IT needs ways to automate, as much as possible, the changing of computer settings when connecting to the network from different locations. The solution must be easy to deploy and manage by the IT staff.

Mobile users face difficulties when connecting to a network from multiple locations. Additional burden is placed on the IT staff in supporting mobile users.

The cost of providing mobile access is high. IT professionals need to position their companies to take on a rapidly growing number of mobile users. Almost one in five computers sold today is a laptop. Approximately 13.9 million laptops were sold to mobile professionals in 1999, and the number will rise to 23.9 million by 2002. These mobile professionals need to access their computer networks from multiple locations. Many of them also need to access other networks. Consultants, for example, need to access multiple client networks as well as their own.

The growing number of mobile users drives up support costs and places increasing demands on an already overburdened IT staff. The complications introduced by frequently adjusting to different work environments make it more difficult and more expensive to support mobile users due to the increase in dedicated help desk estaff that they require. That's because users have to change a number of settings, such as dialing and IP settings, every time they attempt to access a network from a different site. In addition, the growing popularity of telecommuting and the use of virtual private networks (VPNs) is fueling the demand for new communications technologies, such as cable modems and ADSL solutions. These technologies further complicate mobile connections and aggravate the support problem.

Dialing-in creates problems. Dialing issues are the most common source of end-user downtime and involve a large number of cumbersome and error-prone settings. Users must set the correct dial-in telephone number, which is particularly difficult because telephone numbers change continually due to new area codes and new dial-in access lines. Keeping users updated with the most recent phone numbers adds to the cost of supporting them.

Users must also specify any required dialing prefixes, such as 9 for an outside line and whether a 1 is required before the area code for long-distance calls. These prefixes may also involve the setting of delays, for example, between the 9 for an outside line and the 1 for long distance. Entering the correct calling card sequence is also cumbersome, requiring the user to enter the calling card number, a personal identification number, and any required delays between these numbers. Dialing is especially difficult for international travelers because dialing sequences vary considerably from country to country.

Changing locations is complicated. Remote access is burdensome and time consuming for mobile professionals, particularly for those who are not familiar with networking terminology.

As is apparent from the above discussion, a need exists for a solution which allows the IT department to provide mobile users with a fast, easy way to switch their PCs to adjust for location changes. In this way the staff can help increase user productivity and, at the same time, minimize support costs by reducing the number of long-distance and toll calls to the help desk.

SUMMARY OF THE INVENTION

A goal of the present invention is to simplify location switching for mobile users. Another goal of the present invention is to allow easy deployment, management, and update by the IT staff. The present solution should automate, as much as possible, the entry of location-dependent settings for network access.

According to the present invention, a method for a user's mobile client computer to update its configuration specification involves receiving an e-mail from an administrator containing location settings encoded in an attachment. The mobile client application opens the attachment to the e-mail, and writes location values corresponding to the location settings encoded in the attachment into the configuration specification of the computer.

In the preferred embodiment, the e-mail includes a designation of a location name corresponding to the configuration specification, and the configuration specification written corresponds to the location name. Thus, a variety of location specifications may exist in the mobile client computer, such as home location specification, office location specification, and customer location specification. In the e-mail attachment, the location settings are generically defined so as to apply to a variety of operating systems.

The user's mobile client application determines an operating system type for the computer. The user's mobile client application generates the location values by interpreting the location settings for the operating system type for the computer. The interpretation of the generic location settings to produce the location values involves referring to program logic which translates the location settings into location values as a function of the operating system type for the computer.

The location settings which may be specified according to the present invention includes internet settings, such as internet protocol address, a domain name server configuration, a gateway, and a WINS configuration. The locations settings further include dialing settings or local area network settings.

According to another aspect of the present invention, an administrator application on an administrator's computer provides a user's client computer with configuration settings. The administrator application specifies a location name for the user's client computer, for example the administrator may edit or create the home, office, or customer location settings for a specific user. The administrator application further creates an e-mail addressed to the user having the location settings encoded in an attachment, and the administrator application sends the e-mail to the user. The administrator application generically defines the location settings so as to apply to a variety of operating systems. The location settings according to the present invention include internet settings, such as the internet protocol address, a domain name server configuration, a gateway, and a WINS configuration. The location settings according to the present invention further include dialing settings or local area network settings.

The number of mobile computer users is growing rapidly, which has generated a major problem for many companies. The present invention provides the IT staff with a solution that makes changing locations effortless for mobile computer users. In this way, the staff can eliminate nonproductive connection setup time for mobile professionals and reduce calls to the help desk. The solution according to the present invention must be easy to manage and administer so it does not add to the problem of rising network management costs. Furthermore, the present invention prevents users from wasting large amounts of time adjusting their mobile computer connection settings every time they change locations, lowering their productivity. The present invention provides an ideal solution. It helps companies contain support costs by reducing the number of help desk calls, and it helps them increase the productivity of their mobile professionals by simplifying location changes. The resulting cost savings can be significant. In addition, the product keeps network administrators productive through centralized management. Using the present invention, a company can continue to increase the mobility of its workforce to meet the business requirements of the 21st century-without driving up costs.

These and other features and advantages of the present invention are more fully described in the Detailed Description of the Invention, which discusses the Figures in narrative form.

BRIEF DESCRIPTION OF THE DRAWINGS

FIG. 3 illustrates a block of memory within the client computer which defines the various configurable settings of a location to be stored in the client program suitable for implementing the methods according to the present invention.

Figure 1:
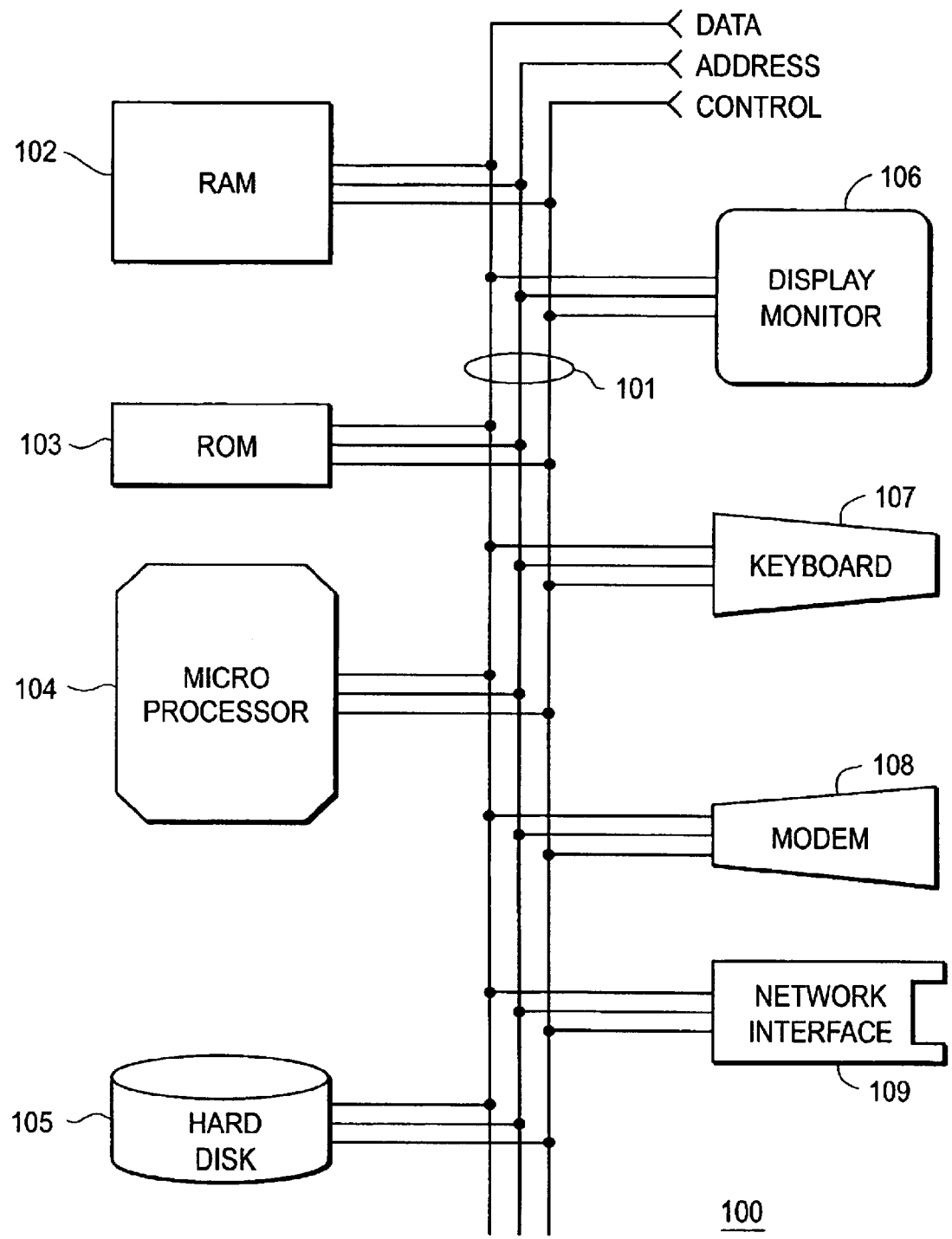
FIG. 1 illustrates a general purpose computer architecture suitable for implementing the methods according to the present invention.

The Figures are more fully described in the Detailed Description of the Invention.

DETAILED DESCRIPTION OF THE INVENTION

A need exists for mobile users to be able to switch network access settings effortlessly when they arrive at a new location. This requires a solution according to the present invention that prompts them with a few easy-to-understand questions to identify the location, then automatically sets up the computer for connection from that location. The solution according to the present invention also provides an easy way for users to set dial-in parameters quickly and troubleshoot them easily when they do have problems-without calling the help desk.

Each time the user accesses the network from a different location, he or she must adjust a variety of settings manually, including:

Connection method. Specifies whether the connection is a direct network connection, a modem connection, or in some cases, an infrared connection.

Dial-in settings. Specify the access telephone number, dialing prefix, and calling card sequence.

IP settings. Adjust the parameters required for IP operation such as for accessing the Internet or corporate intranets.

Proxy settings. Specify the correct Web browser settings for access to the corporate intranet through a firewall.

Network settings. Adjust parameters that are specific to the network to which the user is connecting, such NetWare® or Windows NT. These parameters include specifying such network resources as printers, shared folders, and mapped network drives to be used from this particular location.

Application settings. Set the parameters required by popular applications such as Lotus Notes, cc:Mail, and WinFax.

Working with any one of these settings is complex. Having to deal with them all is overwhelming and time-consuming, especially for typical business users who aren't familiar with network connection terminology. What's more, it drives up support costs significantly because these users must often call the help desk for support. These types of calls are time-consuming to troubleshoot, so the help desk staff may spend a lot more time assisting mobile users.

Consultants who work from multiple client locations face a particularly difficult setup situation. They have to access not only their own network but also their clients' networks, and connection settings vary much more widely across multiple companies than they than do across different facilities within a single company.

The IP addressing problem is difficult. IP addressing is a particularly vexing problem in setting up a remote connection because it involves entering a large number of arcane parameters. For example, in many cases the user needs to enter one or more static IP addresses, each of which is a string of up to 12 numbers with periods embedded in specific locations.

Complicating the problem is that some companies support Dynamic Host Control Protocol (DHCP), but only at certain locations. As a result, many users have to switch between DHCP and static IP addressing. This is a particular problem for consultants who work at multiple client sites and must switch between static and dynamic IP addressing depending on the client they are working with. The increasing adoption of ADSL and cable modem technology as part of corporate telecommuting initiatives is further increasing the need to switch between static and dynamic addressing as both solutions currently require a static IP.

The impact on user productivity and support costs is great. Research indicates that business travelers typically spend about 20 minutes adjusting PC settings every time they arrive at a new location. This does not include time spent resolving problems caused by incorrect settings. The impact on productivity represents a significant cost to the organization. Many mobile professionals are executives whose time is very valuable. To make matters worse, mobile users typically call the help desk for assistance when they run into connection problems, driving up support costs.

FIG. 1 illustrates a general purpose computer architecture suitable for implementing the methods according to the present invention. FIG. 1 illustrates a general purpose computer system 100 suitable for implementing the methods for both the administrator and the user according to the present invention. The general purpose computer system 100 includes at least a microprocessor 104. The general purpose computer may also include random access memory 102, ROM memory 103, a keyboard 107, and a modem 108. All of the elements of the general purpose computer 100 are optionally tied together by a common bus 101 for transporting data between the various elements. The bus 101 typically includes data, address, and control signals. Although the general purpose computer 100 illustrated in FIG. 1 includes a single data bus 101 which ties together all of the elements of the general purpose computer 100, there is no requirement that there be a single communication bus 101 which connects the various elements of the general purpose computer 100. For example, the microprocessor 104, RAM 102, and ROM 103, are alternatively tied together with a data bus while the hard disk 105, modem 108, keyboard 107, display monitor 106, and network interface 109 are connected together with a second data bus (not shown). In this case, the first data bus 101 and the second data bus (not shown) are linked by a bidirectional bus interface (not shown). Alternatively, some of the elements, such as the microprocessor 102 and RAM 102 are connected to both the first data bus 101 and the second data bus (not shown), and communication between the first and second data bus occurs through the microprocessor 102 and RAM 102. The network interface 109 provides communication capability to a local area network LAN using an ethernet connection, for example. The modem 108 allows the computer 100 to communicate through the telephone system. The methods of the present invention are executable on any general purpose computer system such as the 100 illustrated in FIG. 1, but there is clearly no limitation that this computer system is the only one which can execute the methods of the present invention.

The present invention prepares a user's laptop for travel, instantly adjusts location settings, and resolves connection problems to keep you productive on the road.

The Location Administrator according to the present invention contains the central management and deployment of location profiles. As an IS/IT manager it is possible according to the present invention to create and deploy virtually every setting that can be changed in a personal computer.

Using the Location Administrator according to the present invention, the administrator computer can deploy of all of the following settings:

General Location information (Country, City, Time Zone, URL for location information)

Dialing (Including Calling Card Manager and the ability to disable "detect dialing tone")

Network Settings (Microsoft Workgroups, NT domains, and Novell Bindery and NDS settings)

TCP/IP (Static/Dynamic, DNS, Gateway & WINS)

Dial-up networking (Using DUN Manager) and integration with IBM global Dialer

Default Printer

Other Programs (Netscape and Internet Explorer proxy settings, WinFax Pro dialing location, Lotus Notes locations, Lotus CCmail location, and Default MAPI profile for MS Exchange, Outlook)

Deployment is provided according to the present invention via integrated e-mail (Administrator and Client), and the ability to save to file for placement on Intranet or file server.

TCP/IP Switching according to the present invention provides static IPs to mobile users, and allows them to easily switch network environments. Telecommuters and users of Cable/ADSL will benefit greatly from the present invention by not having to enter difficult IP settings when moving from each location.

Microsoft & Novell Network Settings may be changed by the administrator according to the present invention. Being able to change Microsoft Workgroups, Domains, and Novell Bindery/NDS access will greatly improve the mobile work force to have the quickest and easiest access to the resources they need when going to each location.

Multiple network configurations, and distance between office locations require users to obtain different network access rights so that local drives can be mapped, and rights assigned. Now according to the present invention, users will not need to remember which Workgroup/Domain they should be logging into. And they no longer have to remember long NDS contexts, or names of Bindery servers. All of these settings can be saved in a location specification (profile). IS/IT administrators can deploy location update e-mails with these and other settings to mobile users using the Location Administrator.

Calling Card Integration is provided according to the present invention. Now users can save money by easily allowing mobile users to use their company calling cards with their laptop computers. By deploying the proper access number and sequence for the calling card all users need to do is enter their card or pin number and savings begin.

Settings for Default Printer, Dial-up networking, and Other programs can be adjusted according to the present invention. Settings such as, which DUN connection to use, and changing the default printer are compelling features that reduce end-user frustration, when away from the office. Providing the ability to switch common programs such as e-mall and fax will make mobile users more productive.

Preconfigured settings are included according to the present invention. The IT department needs a fast, easy way to create, deploy, and update preconfigured settings that cover all parameters for every location the user is likely to encounter-home, branch offices, manufacturing facilities, customer sites, and hotels.

Reconfigured settings include:
IP Parameters:
  Static or DHCP
  WINS settings, such as whether or not WINS is enabled
  Domain Name Services (DNS) settings
  Gateway settings
  Subnet settings
Proxy Parameters for Netscape and Internet Explorer Network Parameters:
  NewWare settings such as Novell® Preferred Service and Novell Directory Services (NDS) client information, including user name, password, tree name, and context.
  Windows® login settings, including workgroup, computer name (primarily for cable modem usage where the computer name changes for at-home users for security reasons), and Windows NT Domains.
  Network resources settings such as default printers, mapped network drives, and shared folders.
Dialing Parameters, such as Calling Card Sequences, Area code, and Dialing Prefixes Application Parameters:
  Connection method for Lotus Notes or cc:Mail
  Dialing settings for WinFax
  Connection method for Netscape® and Microsoft® Internet Explorer (LAN versus dial-up).

Managing IP addresses in a difficult task for the IT staff as well as for user. It is particularly cumbersome in environments where DHCP is not available or where users need to switch between static and dynamic IP addresses. To simplify management, the solution according to the present invention provides an easy means of distributing and updating static IP addresses to mobile users. The present invention provides automatic DNS settings and determines automatically weather or not DNS is enabled. In addition, it automates proxy settings for Netscape® and Microsoft® Internet Explorer browsers if users need access through a firewall.

The solution according to the present invention gives the IT staff flexibility in controlling what preconfigured settings users can and cannot change. Control ranges from total lockdown to permitting users to change selected settings. All user-modifiable settings are simple and straightforward to change, so users don't create problems for themselves when they make changes.

Centralized administration is available according to the present invention so that the IT staff is able to deploy mobile client software, new and updated preconfigured settings, new telephone access numbers, and new IP addresses quickly and easily from a central location. Installation and configuration of client software does not require user intervention (silent install). Furthermore, the method for deploying preconfigured settings is flexible, enabling the staff to make them available on a Web site or network server for download by the user, or to send updates through the company's email system. Furthermore, administrators are able to change security settings from a central location. A graphical interface for the administrator is also highly desirable to ensure easy creation and modification of preconfigured settings.

Figure 2:
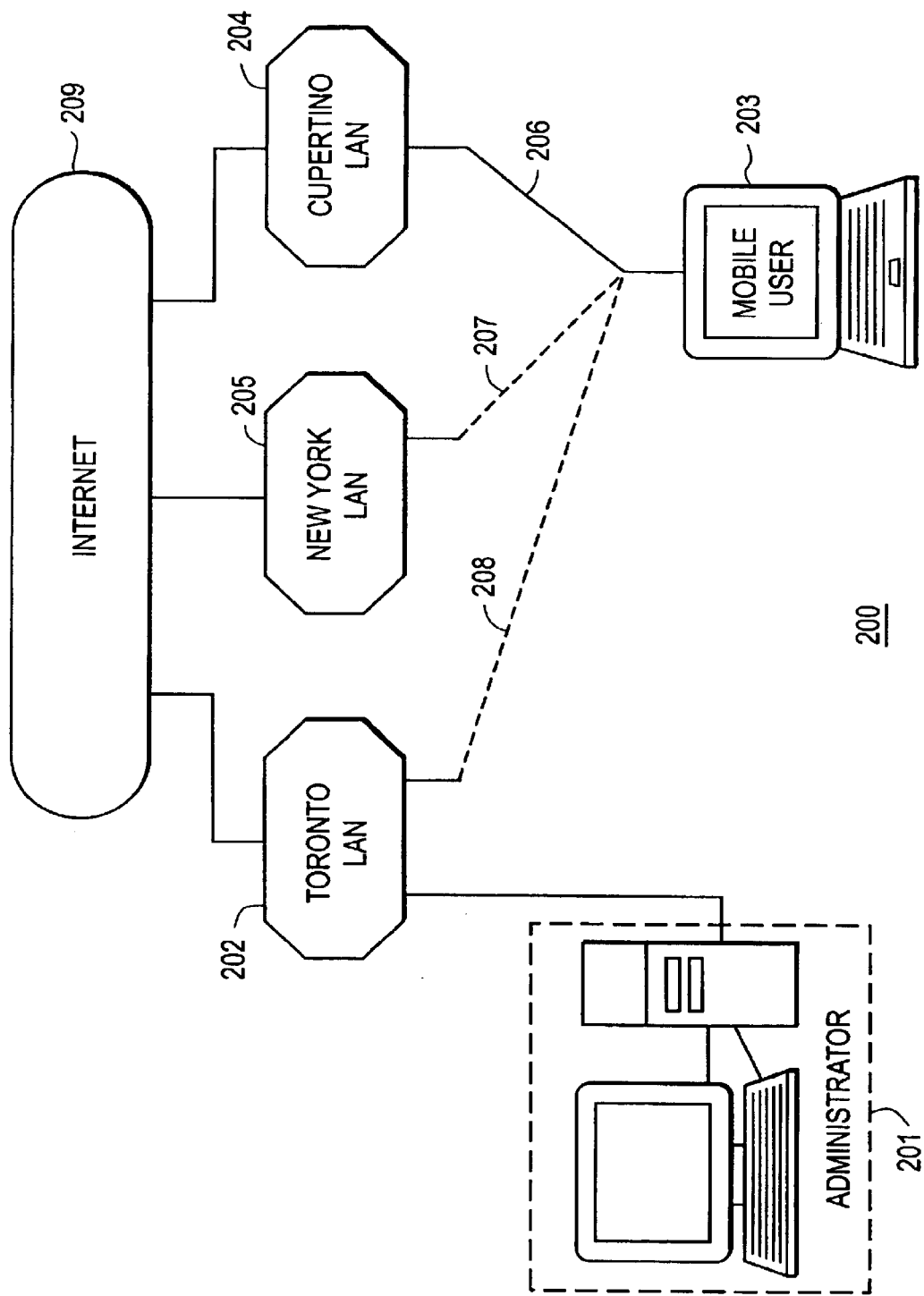
FIG. 2 illustrates an administrator computer and a client computer connected in networks suitable for implementing the methods according to the present invention.

FIG. 2 illustrates an administrator computer and a client computer connected in networks suitable for implementing the methods according to the present invention. The administrator computer 201 is coupled to a local area network 202 through link 206, shown as being physically based in Toronto. The user's mobile client computer 203 is shown as being physically connected to a separate local area network 204, shown as being physically based in Cupertino. A third local area network 205 is shown as existing in New York. Thus, the mobile user's client computer 203 is physically in Cupertino. However, it is possible for the mobile user to take his laptop 203 to New York, and to connect to the New York local area network 205 through link 207. It is also possible for the mobile user to take his laptop 203 to Toronto, and to connect to the Toronto local area network 202 through link 208. All three local area networks 202, 204, and 205 are connected to the Internet 209.

Support for Windows NT is provided. Although many companies still use Windows 95 and 98, most plan to transition to Windows NT to take advantage of its greater security and tighter control over desktop and laptop computers. Many larger companies require NT support in all software they buy. Companies with mixed Windows 95, 98, and NT environments need to standardize on a single solution for mobile users, so they don't incur the management burden and expense of implementing and supporting different solutions for different operating environments.

The present invention provides a comprehensive solution. The present invention is a location management solution designed for enterprises with a large and growing mobile workforce. It enables the IT staff to create, deploy, secure, and update preconfigured settings through the use of location profiles-quickly and easily from a central location. The preconfigured settings make it effortless for mobile users to switch locations. Each location profile includes all the settings required to connect to a network from a particular location, including connection method, dialing settings, IP settings, proxy settings, network settings, and application settings. The present invention supports Windows(r) 95, Windows 98, and Windows NT 4.0 all in a single program. As a result the present invention accommodates mixed environments and diverse user needs without complicating installation and management.

Higher end-user productivity through effortless location switching is provided according to the present invention. The present invention increases mobile users' productivity by significantly reducing the time they spend setting up their computers when they move to a different location. They can switch locations with a click of a button at Windows startup instead of manually configuring settings. This eliminates the time required to adjust multiple settings manually. In addition, it ensures the accuracy of settings, so people don't lose time due to errors. As a result the present invention productivity at any work location and it reduces calls to the help desk.

FIG. 3 illustrates a block of memory 300 within the client computer 203 which defines the various configurable settings of a location to be stored in the client program suitable for implementing the methods according to the present invention. Thus, FIG. 3 represents a configuration specification 300 for the client computer 203. For example, a block of memory 300 within the client application on the mobile user's client computer 203 contains fields as shown in FIG. 3. A group of tags 301–320 provides an index into the various configurable settings of the client computer 203. Preferably, the tags 301–320 are property based, but are logically equivalent to tags indicating the various configurable settings. Fields 351–370 are reserved for storing location values corresponding to the various configurable settings of the client computer 203.

A dialog box appears at the Windows startup and prompts the user to enter the location according to the present invention. Because the profile is selected during start-up, the user does not have to reboot the computer before the settings become effective. This saves even more time. Selecting the location profile is quick and easy according to the present invention. Users of the present invention no longer have to struggle with the complexities of dialing. This is especially helpful for people who travel internationally. The present invention also simplifies the use of calling cards by providing an updated drop-down list of AT&T calling card access numbers along with the appropriate delay parameters. In addition, the present invention makes it easy to distribute the correct dialing sequence for a calling card. The IT department can determine the sequence and distribute it, so every user can easily use convenient calling cards. Laptop users who use a docking station at the office and also work from home can switch effortlessly between docked and undocked operations. The present invention remembers the location profile selected the last time the laptop was docked and the profile selected the last time the laptop was undocked. It automatically detects whether the computer is docked or undocked and selects the proper profile when the user starts up the computer.

Figure 4:
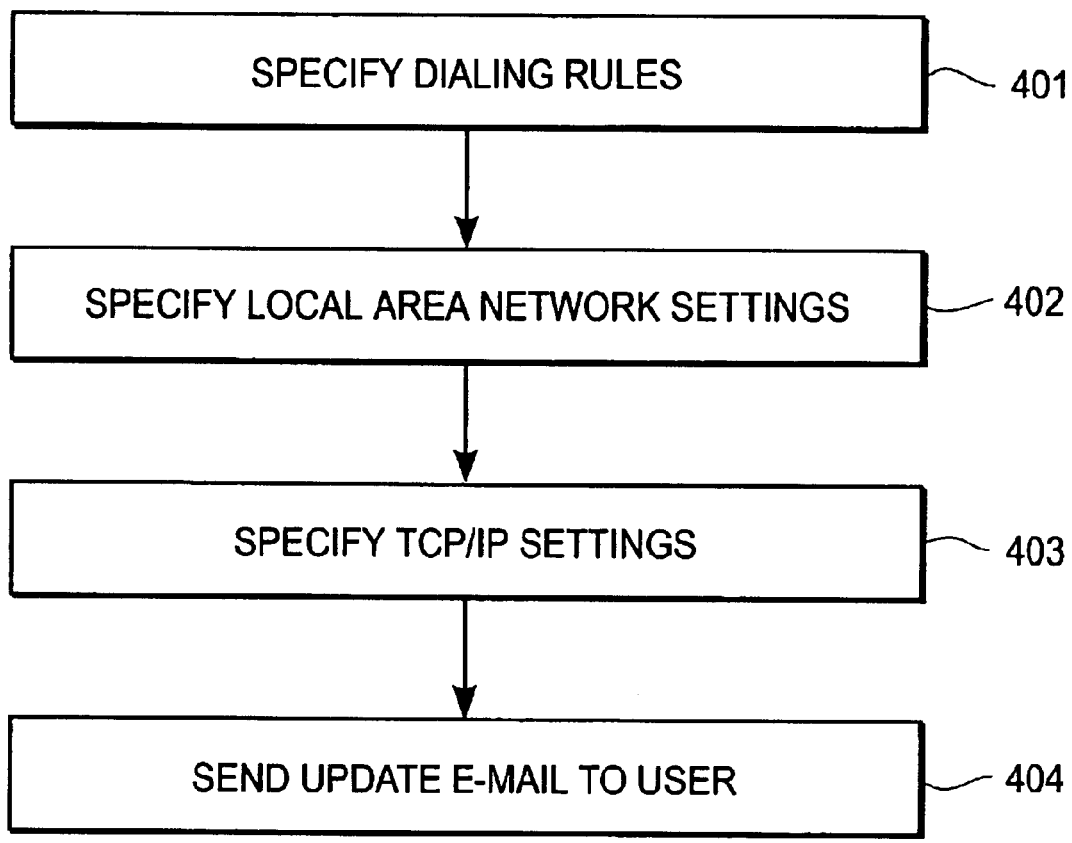
FIG. 4 illustrates a method performed at the administrator computer for defining configurable settings of a user's location according to the present invention.

FIG. 4 illustrates a method performed at the administrator computer 201 for defining configurable settings of a specific location according to the present invention. At step 401, the administrator specifies the dialing rules applicable for the location. At step 402, the administrator specifies the local area network settings applicable to the location. At step 403, the administrator specifies the internet TCP/IP settings applicable to the location. At step 404, the administrator sends an update e-mail to the user.

Figure 5:
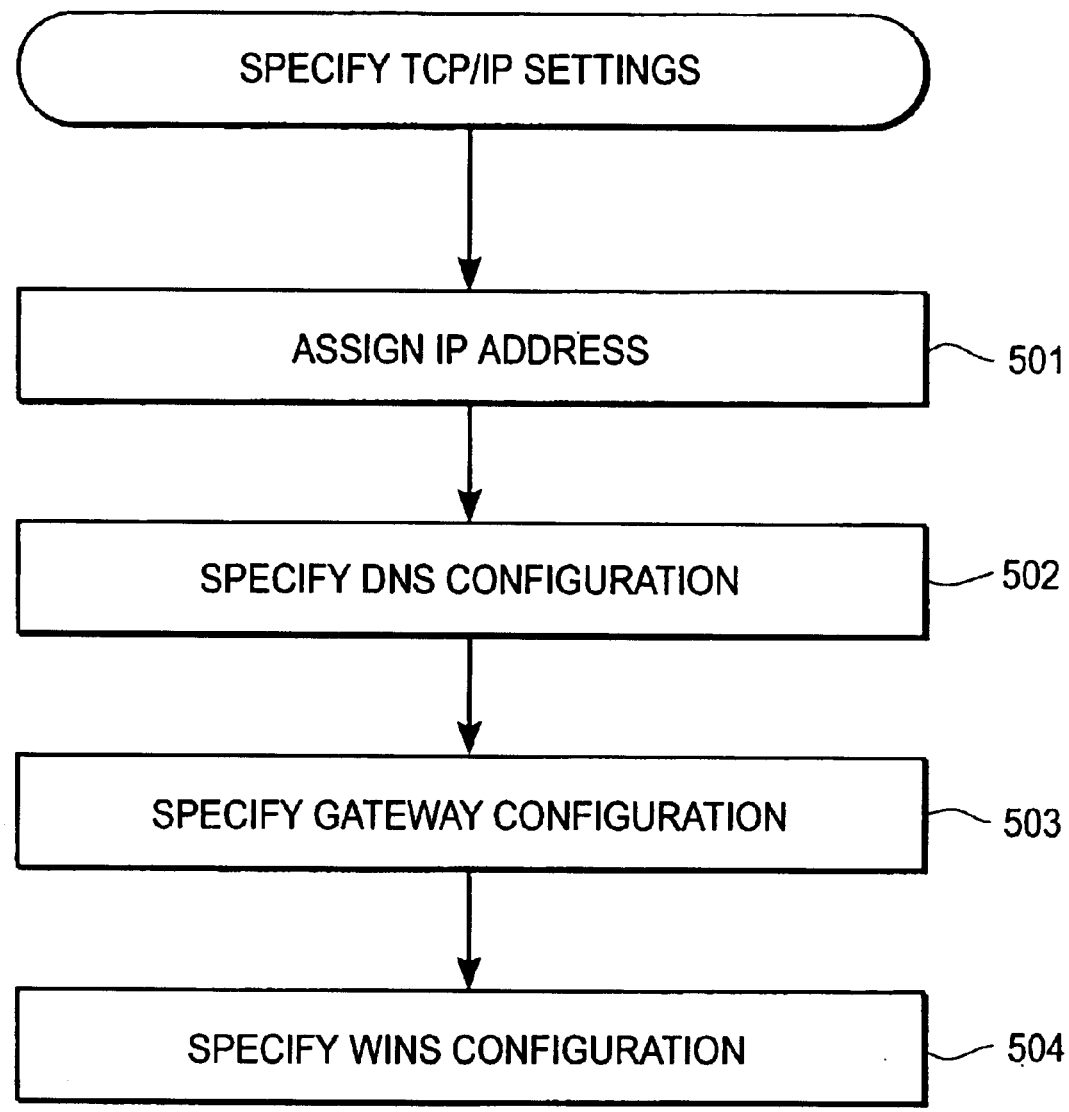
FIG. 5 illustrates a method performed at the administrator computer for defining configurable internet settings for a user's location according to the present invention.

FIG. 5 illustrates a method 403 performed at the administrator computer for defining configurable internet settings for a user's location according to the present invention. At step 501, the administrator assigns an IP address. At step 502, the administrator specifies the DNS configuration for the location for the client computer 203. At step 503, the administrator specifies a gateway configuration. At step 504, the administrator specifies the WINS configuration.

Consultants can travel among client sites without manually adjusting connection settings each time they move. This enables them to begin working as soon as they arrive at a client site by simply selecting the proper location profile at Windows startup. As a result, billable time begins immediately-contributing directly to the bottom line for the consulting firm.

Figure 6:
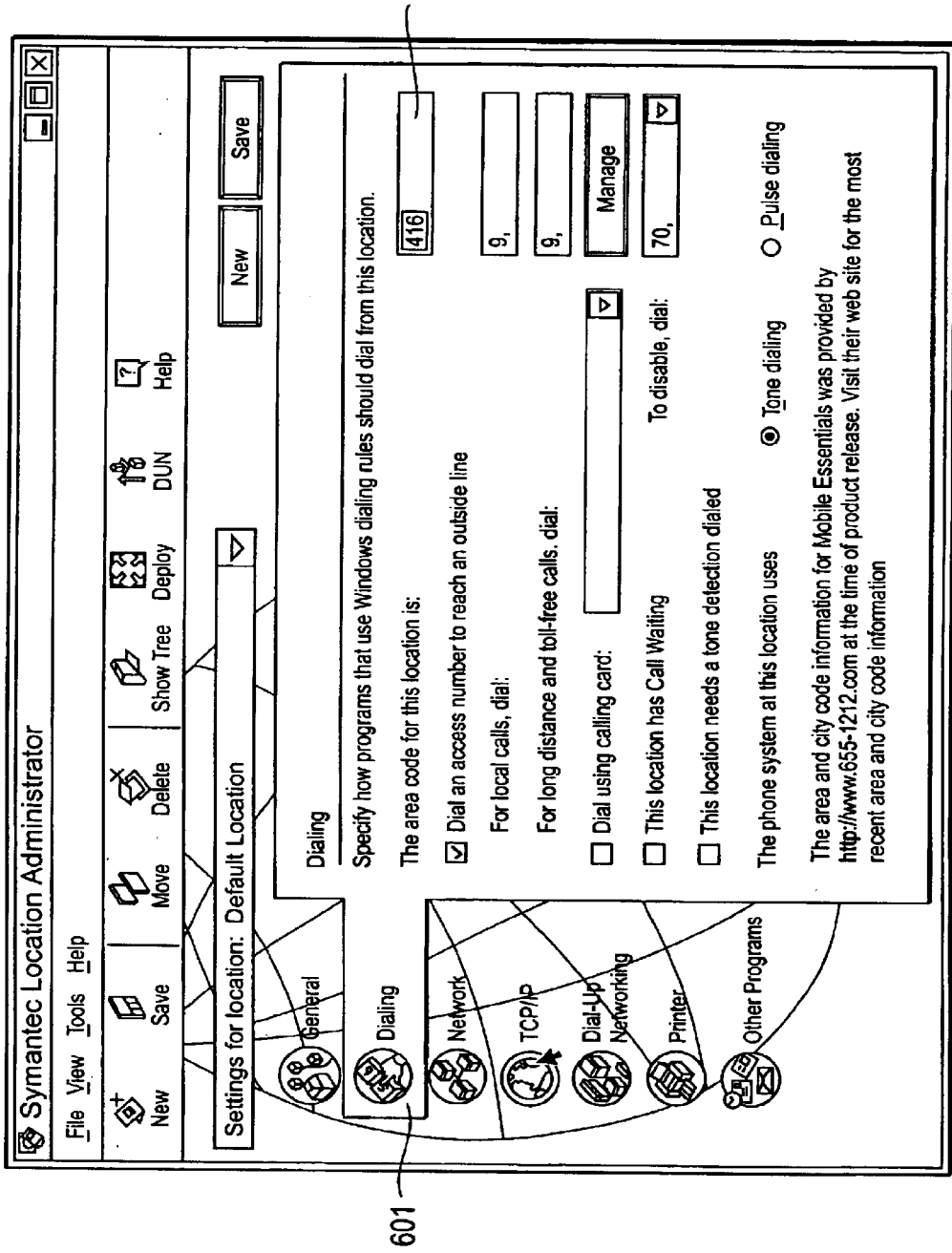
FIG. 6 illustrates a form in the administrator's application at the administrator's computer for setting up dialing preferences for a user's location in the user's application at the client computer according to the present invention.

FIG. 6 illustrates a form 600 in the administrator's application at the administrator's computer 201 for setting up dialing preferences for a user's location in the user's application at the client computer 203 according to the present invention. The form 600 is selected by clicking on a dialing button 601. The form 600 includes a field 602 for specifying the area code for the location.

Figure 7:
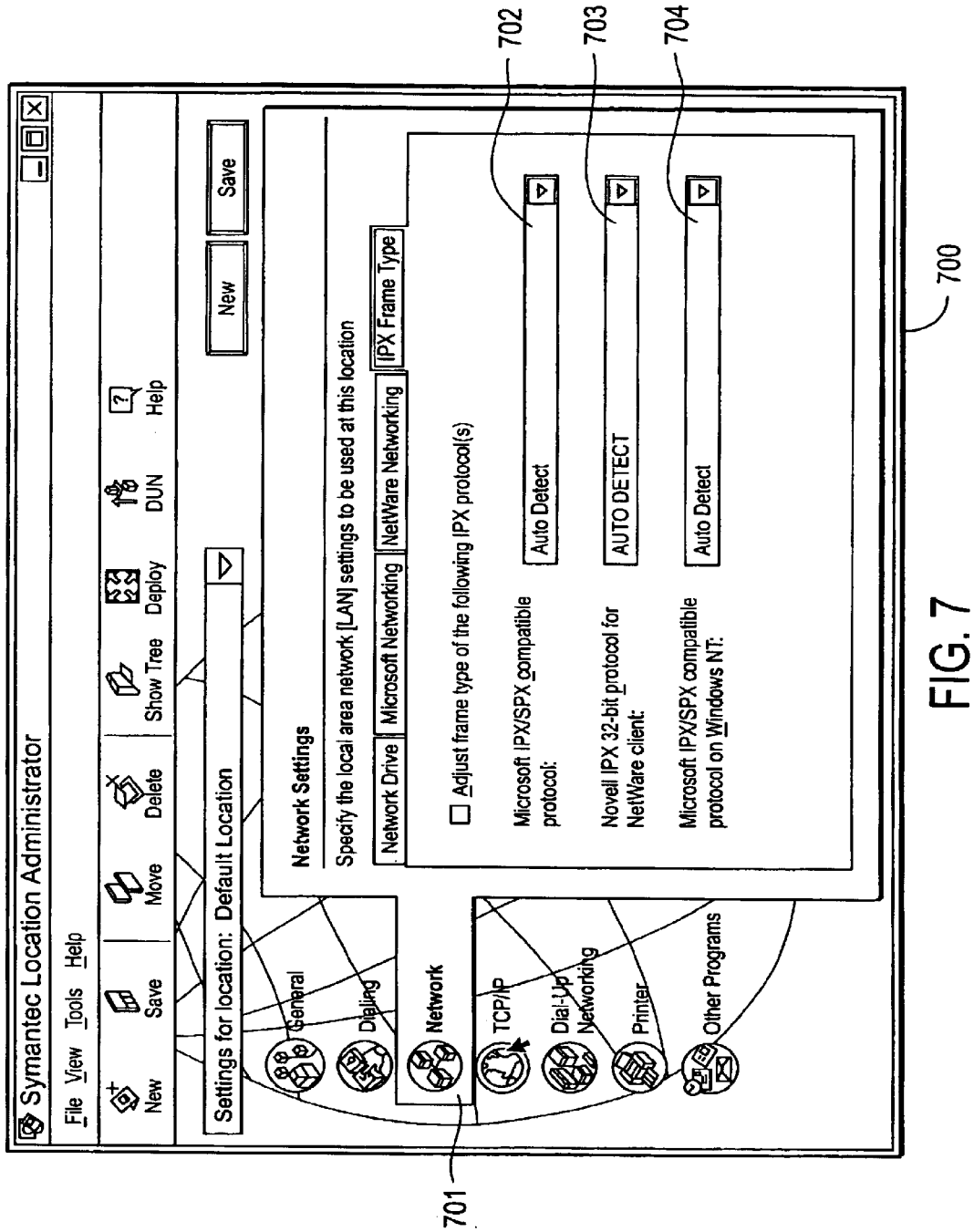
FIG. 7 illustrates a form in the administrator's application at the administrator's computer for setting up network settings for a user's location in the user's application at the client computer according to the present invention.

FIG. 7 illustrates a form 700 in the administrator's application at the administrator's computer 201 for setting up network settings for a user's location in the user's application at the client computer 203 according to the present invention. The form 700 is selected by clicking on a network button 701. The form 700 includes a field 702 for specifying a Microsoft IPX/SPX compatible protocol. The form 700 further includes a field 703 for specifying a Novell IPX 32-bit protocol for NetWare client. The form 700 further includes a field 704 for specifying a Microsoft IPX/SPX compatible protocol on Windows NT.

Figure 8:
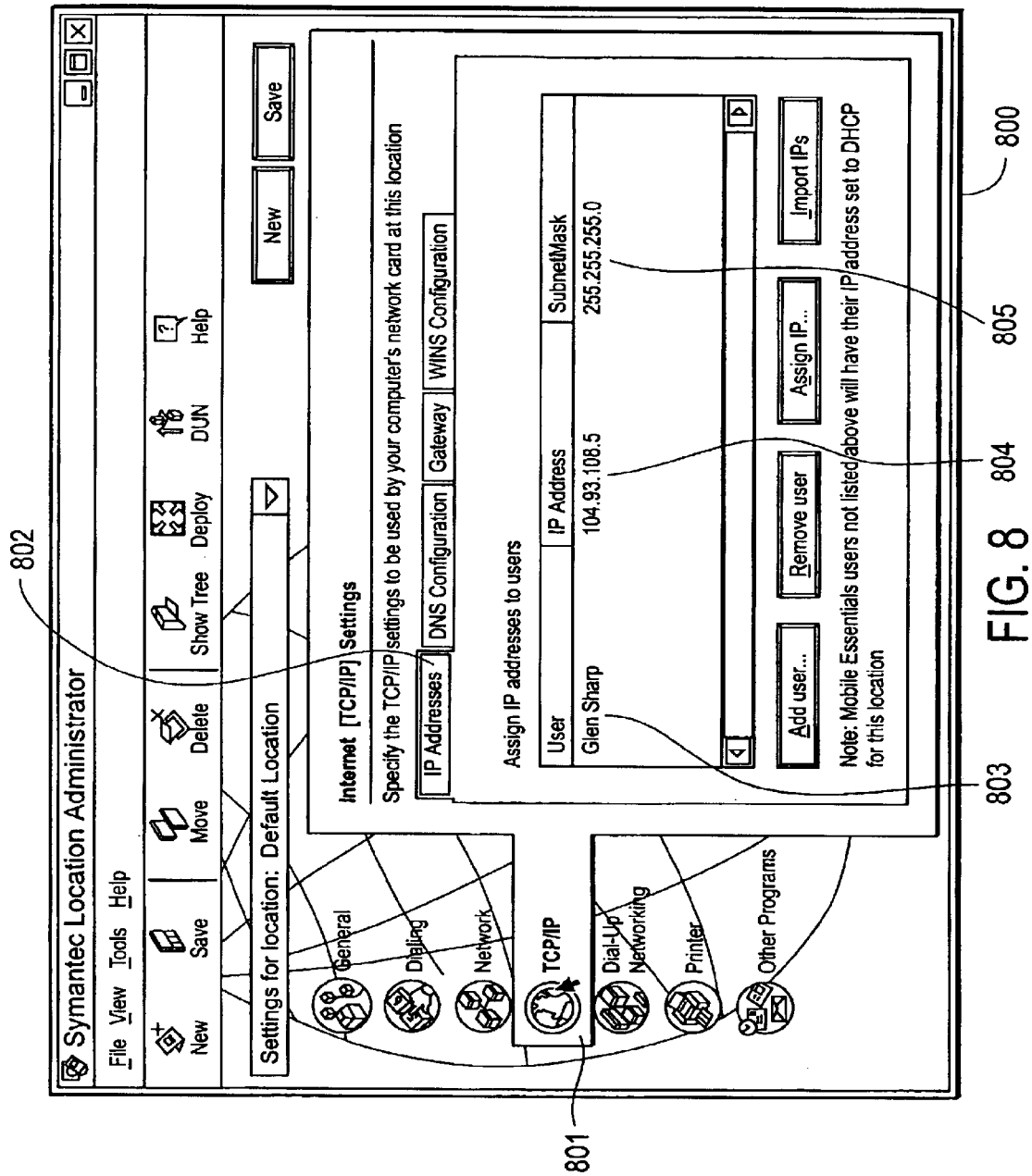
FIG. 8 illustrates a form in the administrator's application at the administrator's computer for setting up TCP/IP internet IP address settings for a user's location in the user's application at the client computer according to the present invention.

FIG. 8 illustrates a form 800 in the administrator's application at the administrator's computer 201 for setting up TCP/IP internet IP address settings for a user's location in the user's application at the client computer 203 according to the present invention. The form 800 is selected by clicking on a TCP/IP button 801 and the IP addresses button 802. The form 800 includes a field 803 for specifying the user's name. The form 800 further includes a field 804 for specifying the IP address for the user. The form 800 also includes a field 805 for specifying the SubnetMask for the user.

Figure 9:
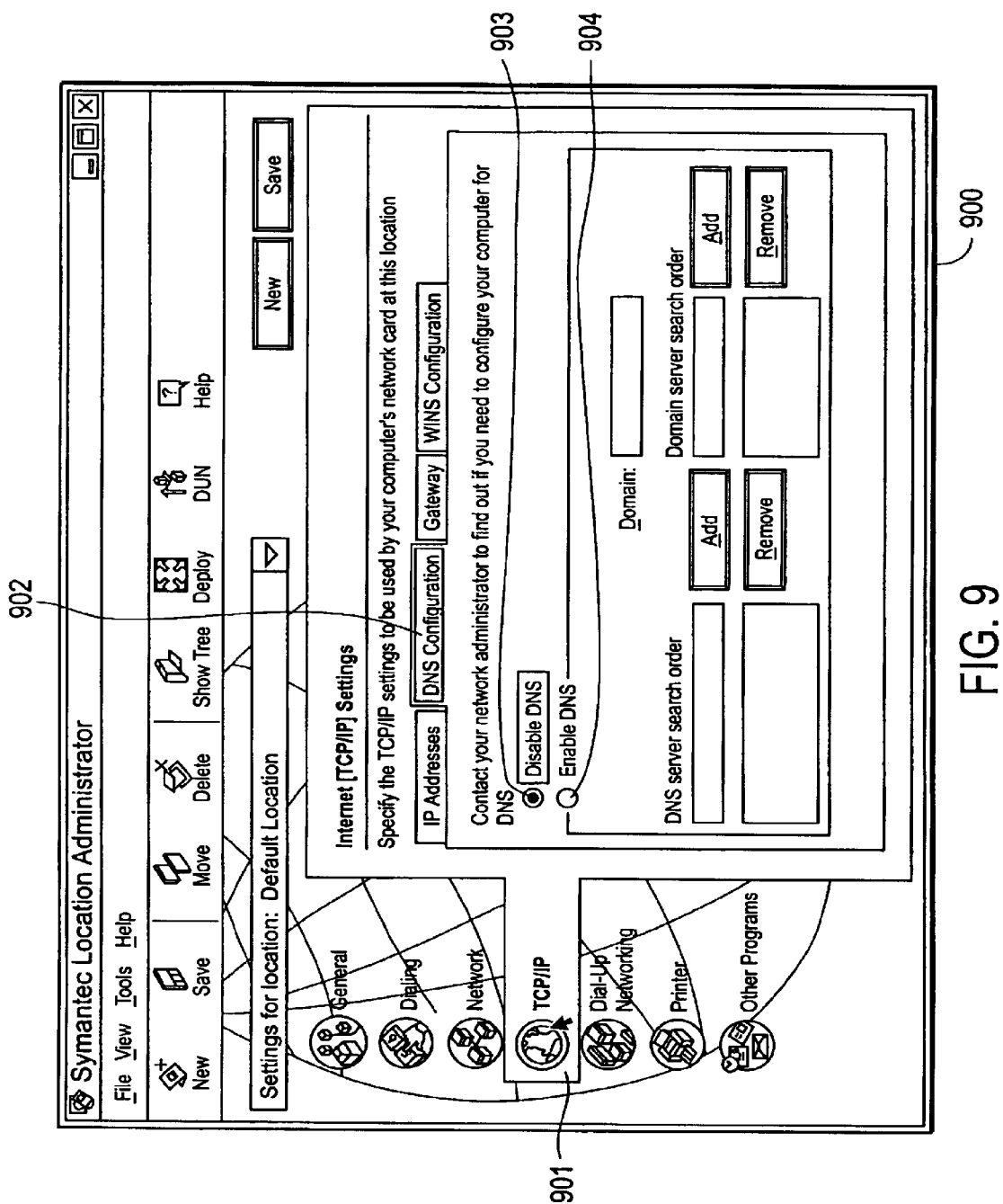
FIG. 9 illustrates a form in the administrator's application at the administrator's computer for setting up DNS configuration settings for a user's location in the user's application at the client computer according to the present invention.

FIG. 9 illustrates a form 900 in the administrator's application at the administrator's computer 201 for setting up DNS configuration settings for a user's location in the user's application at the client computer 203 according to the present invention. The form 900 is selected by clicking on the TCP/IP button 901 and the DNS configuration button 902. The form 900 includes a button 903 for specifying the disabling of DNS, and a button 904 for enabling DNS.

Figure 10:
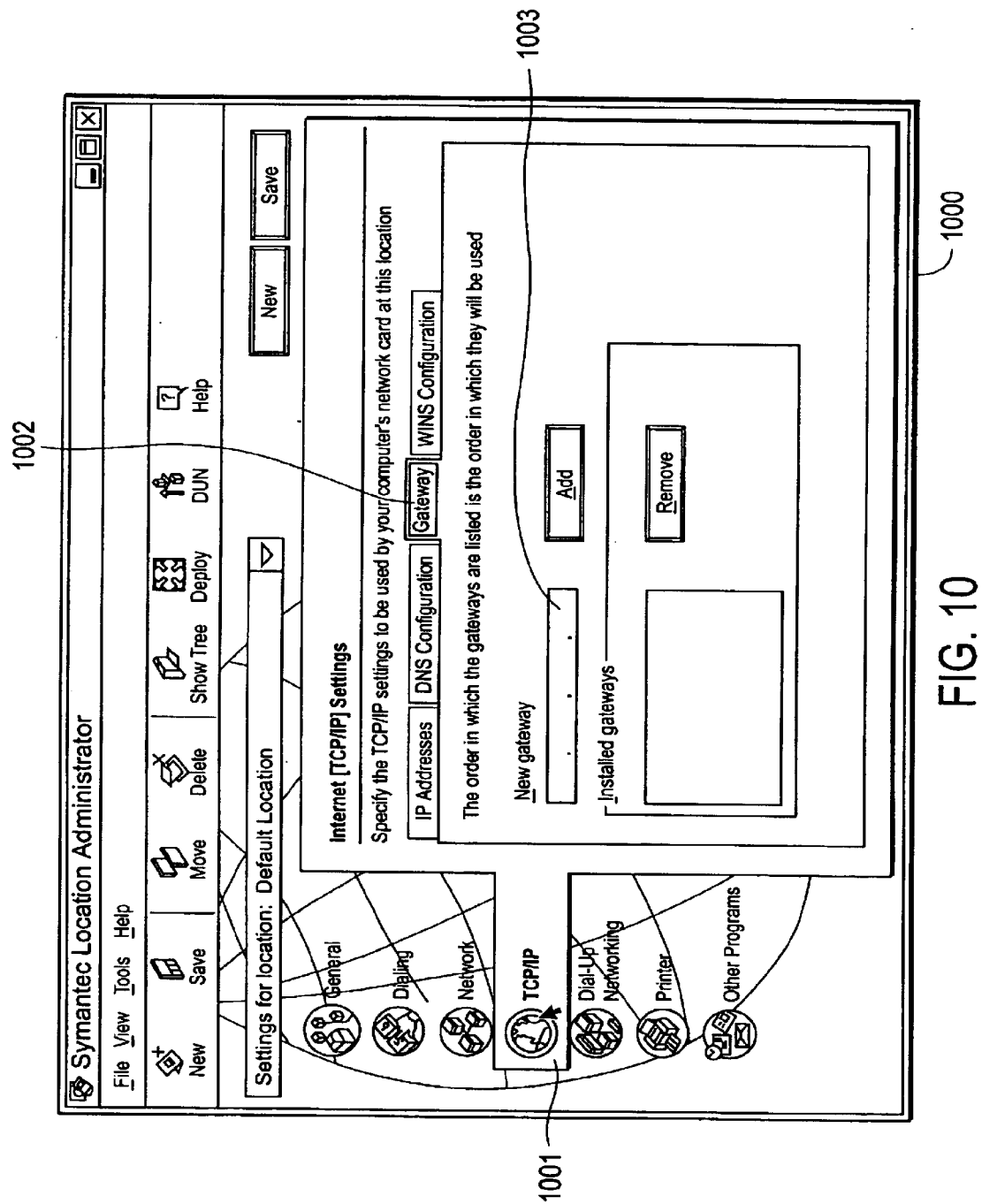
FIG. 10 illustrates a form in the administrator's application at the administrator's computer for setting up gateway configuration settings for a user's location in the user's application at the client computer according to the present invention.

FIG. 10 illustrates a form 1000 in the administrator's application at the administrator's computer 201 for setting up gateway configuration settings for a user's location in the user's application at the client computer 203 according to the present invention. The form 1000 is selected by clicking on the TCP/IP button 1001 and a gateway button 1002. The form 1000 includes field 1003 for specifying a new gateway.

Figure 11:
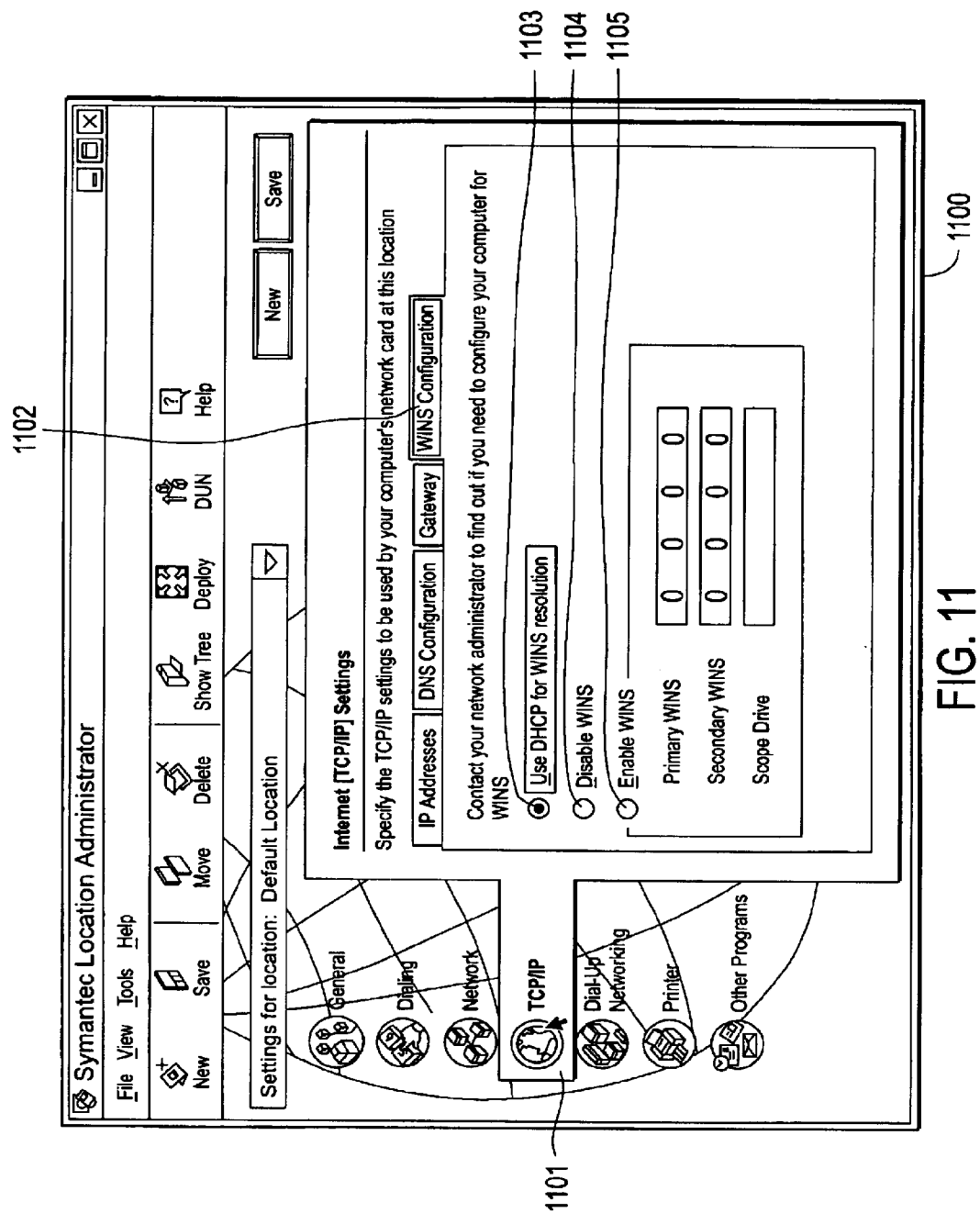
FIG. 11 illustrates a form in the administrator's application at the administrator's computer for setting up WINS configuration settings for a user's location in the user's application at the client computer according to the present invention.

FIG. 11 illustrates a form 1100 in the administrator's application at the administrator's computer 201 for setting up WINS configuration settings for a user's location in the user's application at the client computer 203 according to the present invention. The form 1100 is selected by clicking on the TCP/IP button 1101 and a WINS configuration button 1102. The form 1100 includes button 1103 for specifying the use of DHCP for WINS resolution. The form 1100 includes button 1104 for specifying the disabling of WINS. The form 1100 includes a button 1105 for specifying the enabling of WINS.

The present invention provides reduction in help desk calls and support costs. The present invention simplifies operation for the mobile user, so it reduces the number of toll calls to the help desk-and that reduces support costs. It eliminates the need for laptop users to understand and enter complicated settings every time they move to a different location. It addresses mundane problems such as changing dialing and printer setup, as well as more complex problems such as changing IP and network settings. It also allows the IT staff to lock down location profile settings to prevent users from modifying them and causing problems for themselves which would probably result in calls to the help desk. Fewer and shorter support calls reduce long-distance charges and free up the staff to handle other problems.

Easier IP address handling is provided according to the present invention. The present invention is particularly effective for mobile users who have to deal with IP addresses. Because IP is rapidly emerging as the corporate standard network protocol, this includes nearly all mobile users. People who work in sites that do not use DHCP or use it only in certain locations no longer have to deal manually with static IP addresses or with switching between DHCP and non-DHCP addressing.

If the IT department cannot determine in advance the correct IP addresses for certain locations, they can set up the present invention to prompt users to enter the address the first time they log in from these locations. The product then saves the IP address in the location profile for that location, so the next time the user connects from that location, the IP address is entered automatically.

Figure 12:
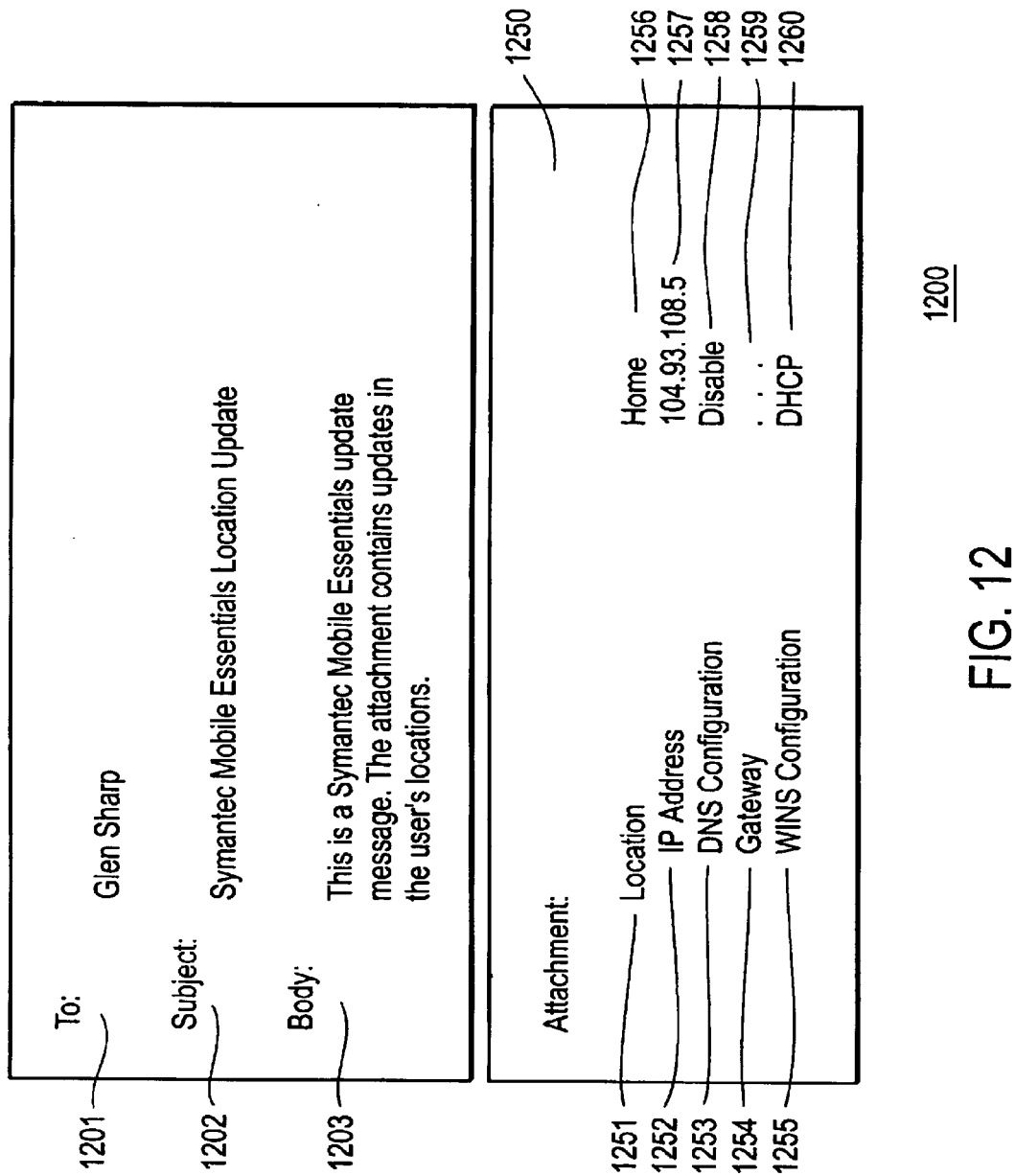
FIG. 12 illustrates an e-mail generated at the administrator's computer and received by the user's client computer according to the present invention.

FIG. 12 illustrates an e-mail 1200 generated at the administrator's computer 201 and received by the user's client computer 203 according to the present invention. The e-mail 1200 includes a line 1201 indicating the recipient of the e-mail 1200. The e-mail 1200 further includes a subject line 1202 that indicates that the e-mail 1200 is a specifically a Symantec Mobile Essentials Location Update e-mail. The user's client application at the client computer 203 reads this subject line 1202 to determine that the e-mail is directed to the user's client application. The human readable body portion of the e-mail includes text which indicates to the user that the e-mail includes an attachment which specifies updates to one of the user's location specifications.

The attachment 1250 is readable by the user's client application. The attachment 1250 in the example shown in FIG. 12 includes a tag 1251 indicating that the contents of the field 1256 designates the name of the location specification for the user that the attachment pertains. In the example shown in FIG. 12, the location specification designated is named "HOME". The tag 1252 indicates that the contents of the field 1257 designate the IP address, which in this example is 104.93.108.5. The tag 1253 indicates that the contents of the field 1258 designates the DNS configuration, which in the example is disabled. The tag 1254 indicates that the contents of the field 1259 designates the gateway, which in this example is not specified. The tag 1255 indicates that the contents of the field 1260 designates the WINS configuration, which in the example is set to DHCP.

Centralized deployment and management is provided by the present invention. The IT staff can manage the present invention from a central location, which helps keep network management costs in check. The staff can configure and install client software, including location profiles, from c central location using a software deployment mechanism such as Microsoft® SMS. Install in silent and requires no user intervention.

The IT staff can deploy updated location profiles from a central location as well, using a variety of mechanisms. The staff can post them on a Web site or file server. Users can then download the profile file and simply click on it for automatic installation. The staff can also distribute profiles through the corporate email system. In this case, the Symantec Mobile Essentials client automatically extracts the updates from the email message and installs them without any user intervention. Because email is a "push" method of distribution, it helps the IT staff ensure that users always have up-to-date profiles. It also enables the staff to select which users receive which updates. For example, the staff may send one set of profiles to the marketing department and another set to field sales representatives.

Easy creation of location profiles is provided according to the present invention. IT professionals can quickly create thousands of location profiles using the Administration console. Each location profile is set up once, then deployed to mobile users. The staff has the flexibility of allowing users to create their own location profiles, which the users can save for re-use. The settings can be locked, preventing end user intervention. The Administration console screen for setting up IP address information is shown as FIG. 8.

Figure 13:
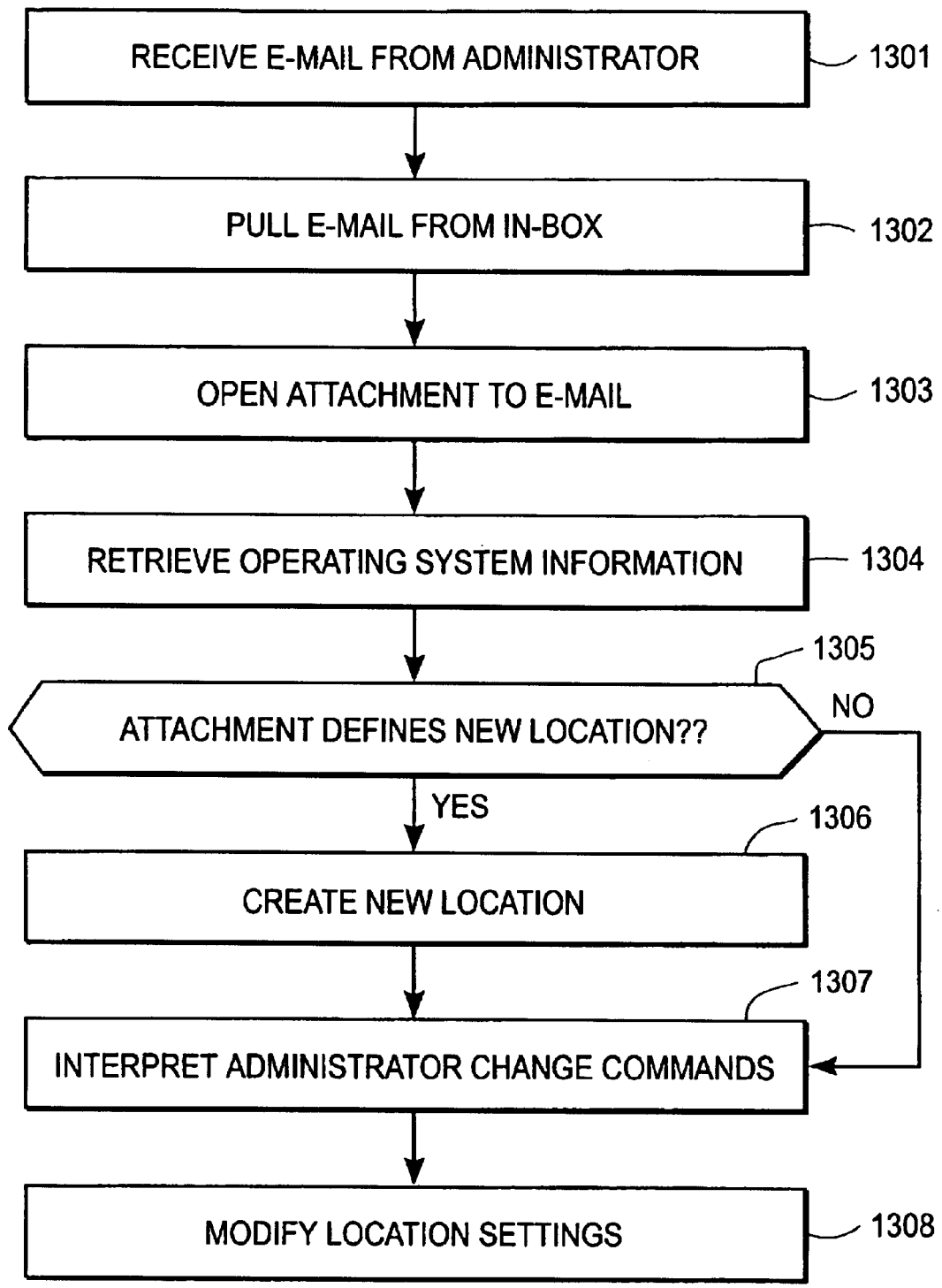
FIG. 13 illustrates a method performed at the user's client computer for updating a user's location settings according to the present invention.

FIG. 13 illustrates a method 1300 performed at the user's client computer 203 for updating a user's location settings according to the present invention. The user's client computer 203 receives the e-mail from the administrator at step 1301. The client application pulls the e-mail from the user's in-box at step 1302. The client application opens the attachment to the e-mail at step 1303. The client application retrieves the operating system information from the client computer 203 at step 1304. Test 1305 determines whether or not the attachment to the e-mail defines a new location or not. If the location name does not correspond to any of the already existing location specification in the user's client application, then the attachment defines a new location specification. If a new location is specified, then the client application creates a new location at step 1306 within the client application; otherwise, the method 1300 proceeds to step 1307, where the contents of the attachment are interpreted by the client application. At step 1307, the client application refers to hard-coded program logic which associates the generically defined location settings to the specific location values which correspond to the operating system on the user's client computer 203. At step 1308, the location settings within the configuration specification are written with the location values derived by the interpretation step from the location settings in the e-mail attachment.

Figure 14:
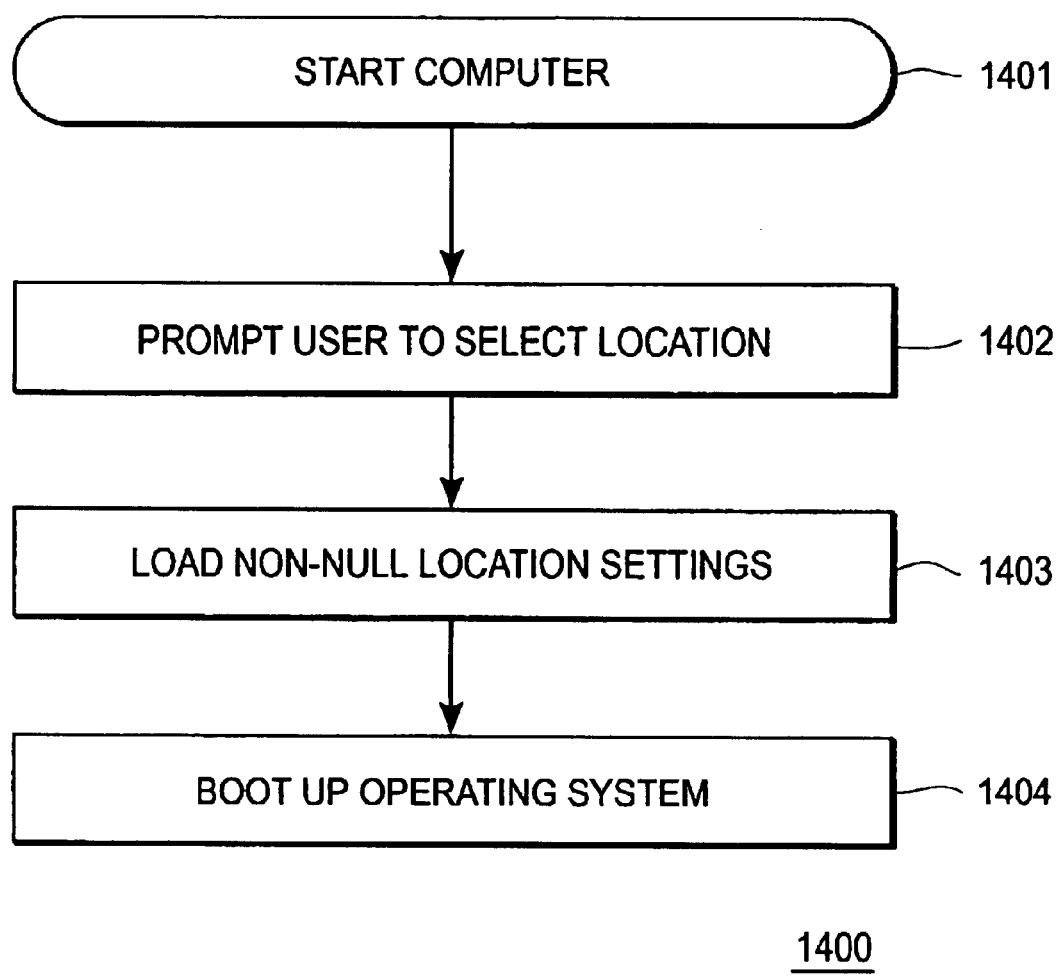
FIG. 14 illustrates a method performed at the user's client computer for booting up the user's client computer according to the present invention.

FIG. 14 illustrates a method 1400 performed at the user's client computer for booting up the user's client computer 203 according to the present invention. At step 1401, the user starts the computer. At step 1402, the user is prompted to select the location. At step 1403, the non-null settings are loaded into the applicable portions of the operating system and/or applications of the client computer from the location specification. At step 1404, the operating system is booted up.

Brands and products referenced herein are the trademarks or registered trademarks of their respective holders.

Although the present invention has been described with respect to its preferred embodiment, that embodiment is offered by way of example, not by way of limitation. It is to be understood that various additions and modifications can be made without departing from the spirit and scope of the present invention. Accordingly, all such additions and modifications are deemed to lie with the spirit and scope of the present invention as set out in the appended claims.

What is claimed is:

1. A method for updating a configuration specification of a computer, the method comprising the steps of:

receiving an e-mail from an administrator containing one or more sets of location settings encoded in an attachment;

opening the attachment to the e-mail; and writing location values corresponding to the one or more sets of location settings encoded in the attachment into the configuration specification of the computer, wherein the one or more sets of location settings are selectable during computer startup by the user.

2. A method as in claim 1, wherein the e-ail includes a designation of a location name corresponding to the configuration specification; and wherein the configuration specification of the computer corresponds to the location name.

3. A method as in claim 1, wherein the one or more sets of location settings are generically defined so as to apply to a variety of operating systems.

4. A method as in claim 3, further comprising the steps of:

determining an operating system type for the computer; and generating the location values by interpreting the one or more sets of location settings for the operating system type for the computer.

5. A method as in claim 4, wherein the interpreting step is performed by referring to program logic which translates the one or more sets of location settings into location values as a function of the operating system type for the computer.

6. A method as in claim 5, wherein the one or more sets of location settings specify internet settings.

7. A method as in claim 5, wherein the one or more sets of location settings specify an internet protocol address, a domain name server configuration, a gateway, and a WINS configuration.

8. A method as in claim 5, wherein the one or more sets of location settings specify dialing settings or local area network settings.

* * * * *

UNITED STATES PATENT AND TRADEMARK OFFICE
CERTIFICATE OF CORRECTION

PATENT NO. : 6,922,723 B1
DATED : July 26, 2005
INVENTOR(S) : Glen Sharp et al.

It is certified that error appears in the above-identified patent and that said Letters Patent is hereby corrected as shown below:

Column 13,
Line 3, replace "e-ail" with -- e-mail --.

Signed and Sealed this

Twenty-seventh Day of September, 2005

JON W. DUDAS
*Director of the United States Patent and Trademark Office*